United States Patent [19]
Bouteille et al.

[11] 4,027,692
[45] June 7, 1977

[54] SYSTEM ALLOWING THE REALIZATION OF LOGIC CIRCUITS BY JUXTAPOSITION OF PNEUMATIC ELEMENTS

[75] Inventors: Daniel Bouteille, Marnes la Coquette; Pierre Hardouin, Asnieres; Andre Thomasse, Cocherel, all of France

[73] Assignee: La Telemecanique Electrique, France

[22] Filed: Mar. 17, 1975

[21] Appl. No.: 559,356

[30] Foreign Application Priority Data
Apr. 1, 1974 France .............................. 74.11546

[52] U.S. Cl. .............................. 137/270; 137/269; 137/552; 235/201 ME
[51] Int. Cl.² ..................... F15C 3/00; F16K 37/00
[58] Field of Search ................ 137/269, 270, 552; 235/201 ME

[56] References Cited
UNITED STATES PATENTS
3,875,959   4/1975   Bouteille ............... 235/201 ME X Primary Examiner—Alan Cohan
Assistant Examiner—Gerald A. Michalsky
Attorney, Agent, or Firm—William Anthony Drucker

[57] ABSTRACT

Pneumatic logic system.

The logic chain is established by juxtaposition of logic modules each of them being provided with a selecting organ having at least two positions allowing to modify the circuit diagram.

Advantageous system for the sequential control of machines by pneumatic way.

6 Claims, 18 Drawing Figures 1 (a)  1' (b)

SYSTEM ALLOWING THE REALIZATION OF LOGIC CIRCUITS BY JUXTAPOSITION OF PNEUMATIC ELEMENTS

The invention relates to a system for construction of pneumatic logic circuits by the juxtaposition of logic modules achieving elementary logic operations and of selecting units which cooperate with two adjacent logic modules and which conformation allows to connect certain openings of a module to other openings of the adjacent module, each of these logic modules and selecting units presenting on its visible frontal surface graphic symbols representing its own function, so that their juxtaposition represents the diagram of the thus constituted logic circuit.

Such systems are largely employed in installations where the automatic control of machines must be operated by pneumatic means, particularly in the case of sequential control of operations.

Systems according to the above description are already known, in which the selecting units must be constructed pursuant to a different principle in accordance with the function of interconnection they must achieve, said selecting units having dimensions identical to those of the logic modules which they must connect.

These systems present numerous inconveniences following either from their complexity or from their volume. Firstly, each selecting unit is constituted of a multiplicity of parts comprising especially a rotary dome-shaped element imprisoned between two flanges with many drilled openings; when it is desired to assign a certain function of interconnection to this selecting unit, one must give to the rotary element one of the four possible positions and positively seal two of the four available openings; then the flanges are assembled by gluing and the frontal surface of the selecting unit is provided with a removable tag representing the function.

The whole of the offered variants lead to the possible realization of seven different selecting units and therefore requires the presence of seven tags. It is obvious that it thus results in a complexity and a high cost-price, which are also aggravated by the fact that the tags can be placed without correspondance with the effective function, thus creating dangerous confusions.

Then, the sizes given to the selecting units become prohibitory with regard to the role that they must play in the logic chain so that the logic system becomes bulky in proportion to its length; this last feature introducing also a certain brittleness.

Finally, the whole of the system has been designed to be able to answer all cases of diagrams susceptible to be proposed, where as only some of them one of a frequent interest for the user so that to realize them, the number of units to assemble is prohibitory.

It must also be noted that some of the above inconveniences are due to the fact that the fluid inputs or outputs are always placed on the same side of the modules, of which only three of the four available faces have been utilized.

Therefore, the invention purposes to remedy the above mentioned inconveniences and now to provide logic modules and selecting units whose overall area is reduced, whose constructional simplicity is great and whose choice of the selection function is simple, without presenting risk of confusion. A second object of the invention is to constitute the selecting units and the modules in order that the interconnections they achieve allow the elaboration of logic diagrams which are the most particularly suitable for the step-by-step control of machines or installations where the sequential aspect of the operations is preponderant.

A complementary result that the invention provides is that the selecting organs may also be employed when each logic module is composed of two assembled distinct elements, of which one is a baseplate designed for receiving the various pipings receiving the pneumatic signals and transmitting the fluid supply, whereas the other element is only assigned to the realization of the elementary logic operation in which it is concerned.

According to the invention, the first result is reached by the combination of the following measures:

a. the logic modules are directly juxtaposed one against the other by their lateral faces;

b. the frontal surface of each logic module is divided into a first region which bears the graphic symbol of its function and into at least a second region free of symbol which is placed near the adjacent module and is shaped to receive a selecting unit;

c. the selecting unit comprises a single part located on, or in the second portion where it can take two positions for each of which its graphic symbol cooperates with the graphic symbols of two adjacent modules;

d. the selecting unit has permanent channels whose putting to use depends only upon the position of said unit.

Other features will appear from the following description with reference to the drawings, in which.

The logic modules and associated selecting units have particularly for object to allow their association for making those logic circuits, whose frequency of use is greatest in the automatisms, without nevertheless excluding the possibility of achieving other circuits.

Figure 1:
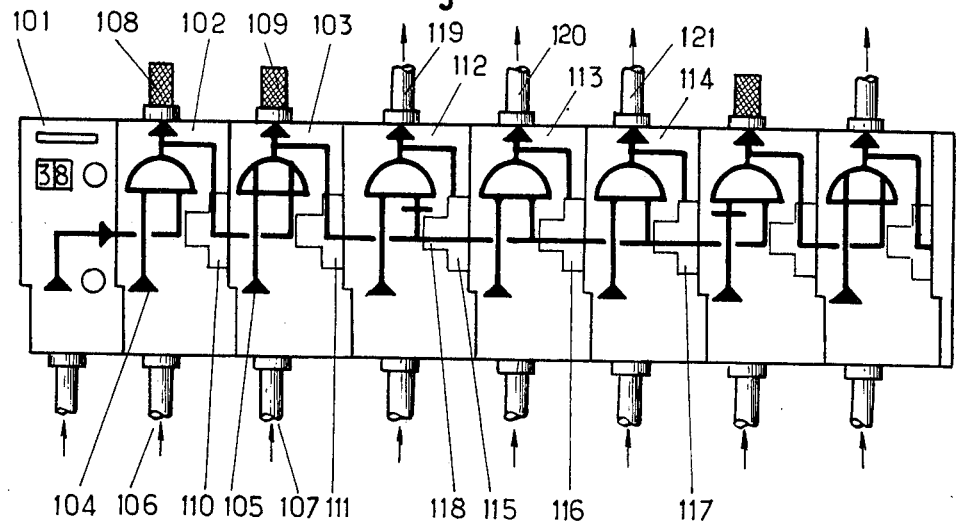
FIG. 1 represents the logic chain of a pneumatic control system.

Among these logic circuits two are frequently encountered and they are illustrated in FIG. 1 where the first element found in the chain of modules starting from the left is a connecting unit 101 associated with two cascade-mounted logic modules 102 and 103 i.e. thus as shown in the principle diagram with which they are equipped, the output of module 102 is coupled with one of the inputs of module 103; the other logic inputs reference-marked 104 and 105 serve to introduce other validation signals which are presented in the pipings 106, 107. Each logic module such as 102, 103 and so on, is equipped on its transverse back face with an output orifice connected to the output of the logic function, but in the case of cascade-mounting these outputs are sealed by plugs 108, 109. The lines which symbolise the connection of the outputs of modules 102 and 103 run through two regions 110, 111, representing the selecting units. The position of these selecting units will determine in what way each logic module is connected to the following one.

If the modules 112, 113, 114 are examined, it is seen that the associated selecting units marked 115, 116, 117 bear symbols of circuit portions different from the two other selecting units and that the arrangement of the logic modules 112, 113, 114 is not a cascade-mounting, but one in which the internal inputs of the logic functions are parallel-mounted, the piping indicated by the line 118 constituting a pressure-channel common to all internal logic functions. In this case, the outputs of the logic functions are transmitted towards the outside by means of pipings 119, 120, 121.

Figure 2:
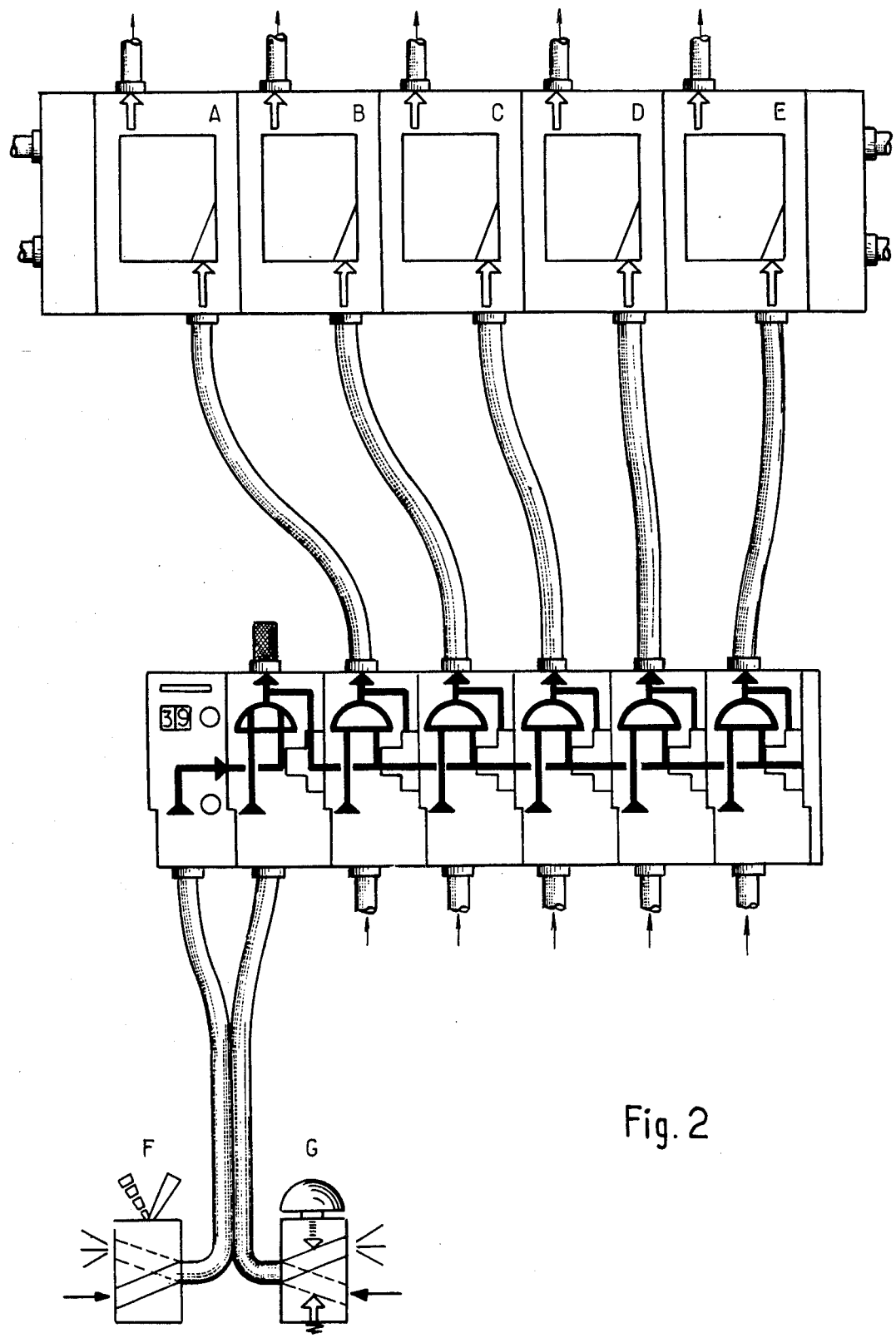
FIG. 2 represents a similar system applied to pneumatic components of control.

An example of application of a similar system is illustrated in FIG. 2 wherein more elaborate pneumatic units marked A,B,C,D,E, are connected to the outputs of an association of logic modules. In the represented system, the logic module situated on the left allows to introduce a pressure issuing either from a permanent distributor F, or from a stroke-after-stroke distributor G, the pressure being then simultaneously communicated to all internal inputs of the logic molules.

The constitution of these modules and of their associated selecting unit may take various forms which are illustrated in FIGS. 3, 4, 5, 6 and 7. Although these figures constitute only diagrams, whose practical realization will be hereafter illustrated, it will be noted that in all cases the modules can be directly associated each against the next. Although functionally the selecting unit might be placed between the logic modules, measures have been taken in order that neither the volume nor the surface of the selecting unit increases the area of the logic modules.

Figure 3:
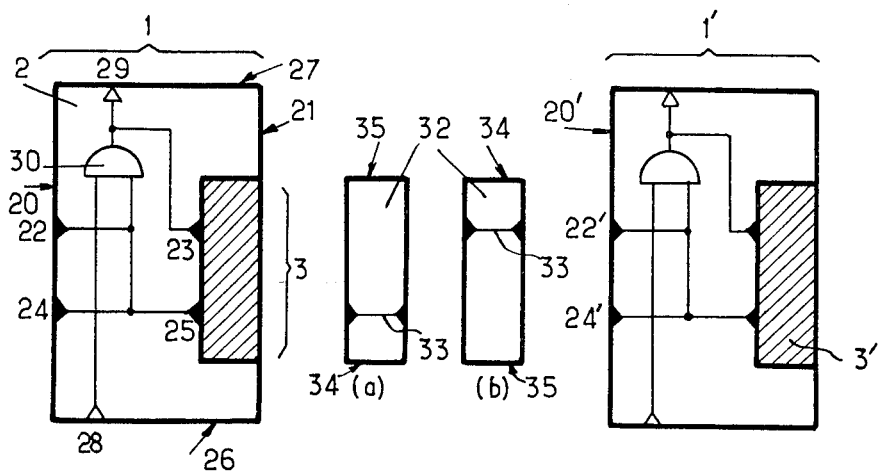
FIGS. 3 to 5 illustrate embodiments of logic modules equiped with selecting units.

In FIG. 3, the left side face 20 has two input orifices 22, 24, the front and back transverse faces 26, 27, have two orifices 28, 29 one of which being is associated with a logic input and the other with the logic output.

The whole of the logic part is represented in a first non-cross-hatched region 2, which also carries the theoretical diagram of the function, whereas the cross-hatched region represents a second region 3 free of diagram, but on which or in which the selection unit 32 separately represented on the right of the module will be located. Two orifices 23 and 25 respectively connected to the output 29 and to the inputs 22 and 24 end at the spatial limit of the second portion. The selecting unit 32 is represented in each of its two possible positions a or b for which the channel 33 that it contains can connect with the orifices 25 and 24' of the following module 1', or also the orifices 23 and 22'. It is clearly seen that through the simple turning over of the selecting unit there are obtained different module-to-module connections allowing the cascade or parallel association of the logic functions 30.

Figure 4:
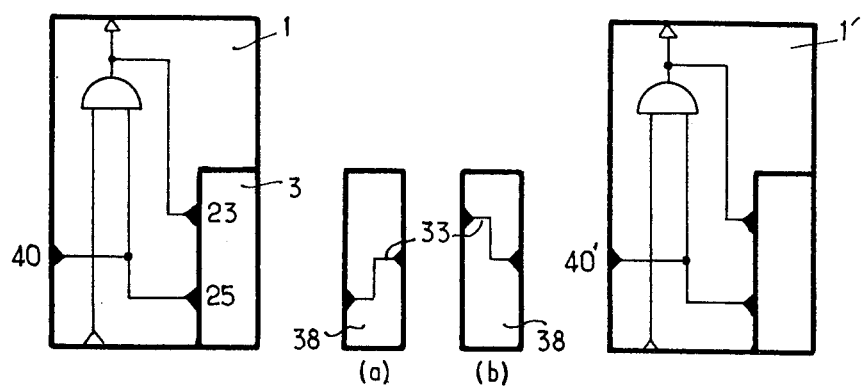

In the embodiment illustrated in FIG. 4, both orifices 22 and 24 are blended into a single orifice 40, so that the selecting unit 38 must present a channel 33 which is differently shaped to permit a selective connection between the orifice 40' of the following module and the orifices 23 and 25 of the preceding module.

Figure 5:
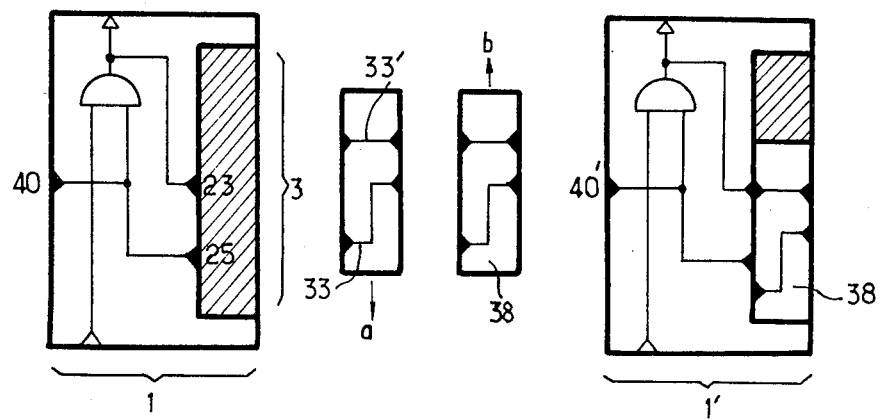

In the embodiment illustrated in FIG. 5 it is seen how a similar module to that of FIG. 4 may be associated with an adjacent module by means of a selecting unit 38 having two channels 33 and 33'; the selection of the types of module-to-module interconnection is here effected by a displacement of the selecting unit which does not necessarily require a complete rotation and may be a sliding movement.

Figure 6:
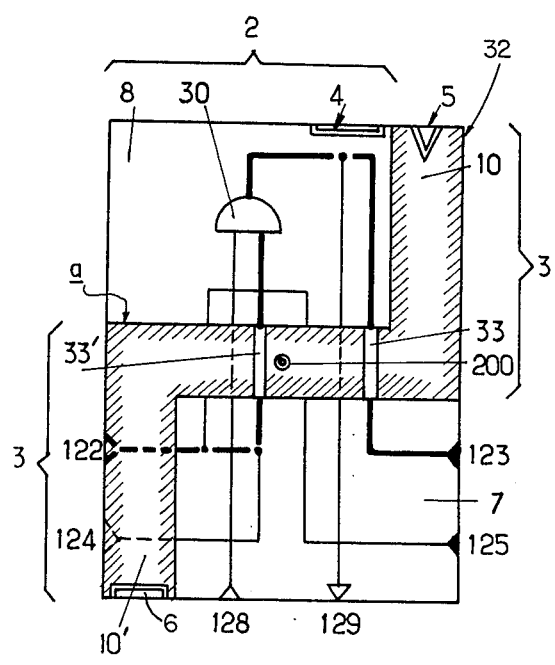
FIGS. 6 and 7 represent as embodiment wherein the module is composed of a baseplate and of a removable logic subassembly, both assembled.
Figure 7:
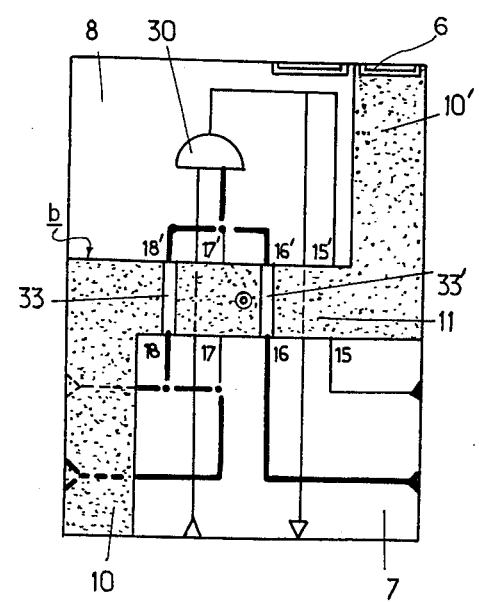

The embodiment represented in FIGS. 6 and 7 relates to the case wherein the logic module is not constituted by a single element but comprises two assembled parts.

This embodiment can be of particular interest in the case where it is desired to group into a baseplate all the inputs and outputs of fluid piping, whereas for reasons of maintenance grounds it is desired to incorporate the logic function into a renewable or replaceable subassembly connected to the baseplate.

FIGS. 6 and 7 show with greater clarity the fluid flows which are modified according to use of positions a and b of the selecting unit.

The baseplate 7 contains two orifices 122, 124 on its left side face and two orifices 123, 125 on its right side face. These orifices have the same role of connection as the corresponding orifices 22, 24, 23, 25, of the module described in FIG. 3. However clearly understood that the selection of the active orifice is not effected between two modules, but in an inner zone of the module.

For this purpose, a dotted region 3 is arranged between the baseplate 7 and the logic subassembly 8 which contains only the logic operator 30; in this region there is located a selecting unit 32 equipped with two channels 33, 33', and presenting two opposite prolongations 10, 10' the extremities of which each bear a portion 5, 6 of the diagram corresponding to their function and positioned so as to become level with the region 2 which constitutes the front face of the module containing the principle diagram 4. The two positions a and b represented in FIGS. 6 and 7 are obtained by a turning the unit about around a fictitious axis marked 200, the central region 11 of the selector effecting the desired connections between the channels 15, 16, 17, 18, of the baseplate and the channels 15', 16', 17',18', of the logic subassembly.

There are now described examples of construction corresponding to the principle representations above illustrated.

Figure 8:
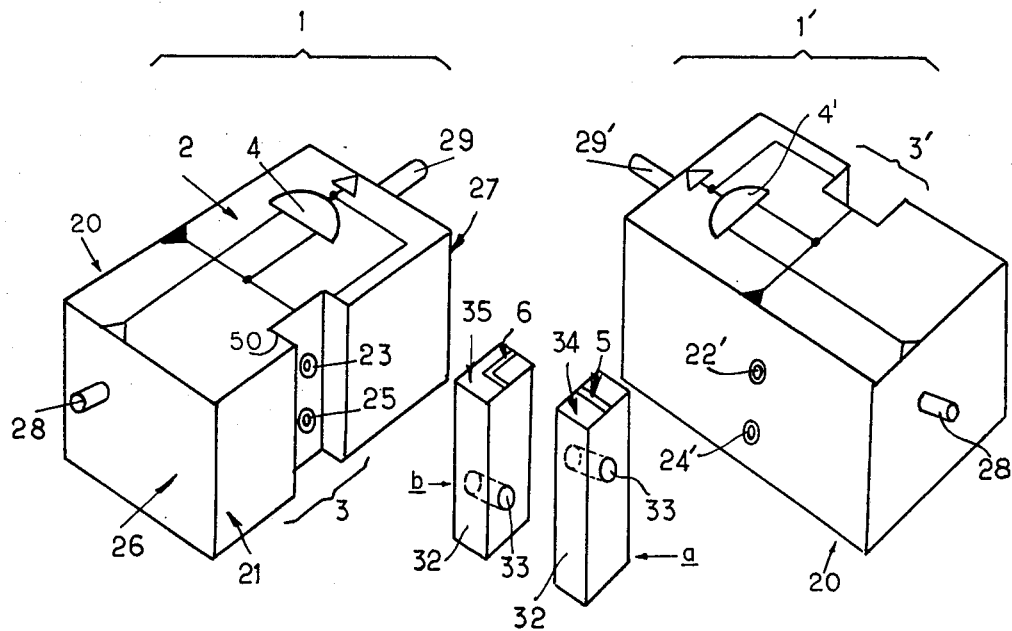
FIGS. 8 to 12 represent examples of construction according to the principles illustrated in FIGS. 3 to 5.

FIG. 8 shows two adjacent modules 1 and 1' between which the selecting unit 32 has been represented in the two positions a and b that it can adopt.

As in the corresponding principle representation of FIG. 3, the module 1 or 1' contains on its front face a first region 2 on which is disposed at 4 a symbolic representation of its function. A second region 3 of the front surface contains no diagram and includes an end of a groove 50 in whose base are the orifices 23 and 25; the front and back transverse faces 26, 27 are equipped with orifices 28, 19, whereas the left lateral face 20 contains two orifices 22 and 24.

The selecting unit 32 has dimensions and shaping allowing it to be placed in the groove 50; its upper face 34 (in position a) comprises a symbol 5 which cooperates with symbols 4, 4' carried by two adjacent modules 1, 1'; in its position b, one face 35 opposite face 34 and bearing another symbol 6 represents another type of connection between the two adjacent modules. A channel 33 drilled in the body of the unit 32 therefore appears either opposite orifices 23, 22, or opposite orifices 25, 24.

Figure 9:
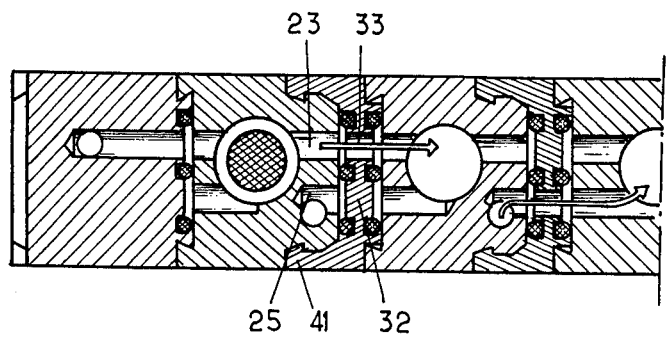
Figure 10:
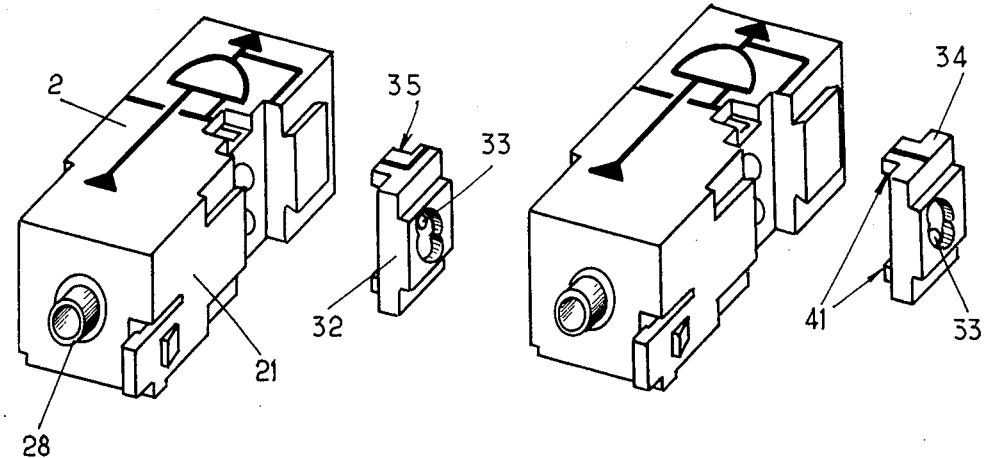

When the modules are associated, their lateral face left 21 and right lateral face 20 are directly put in contact because of the thickness of the unit 32. A more elaborate construction is represented in FIGS. 9 and 10, where the selecting unit contains further projections 41 allowing its engagement onto module; the items having the same functions bear the same reference-marks.

Figure 11:
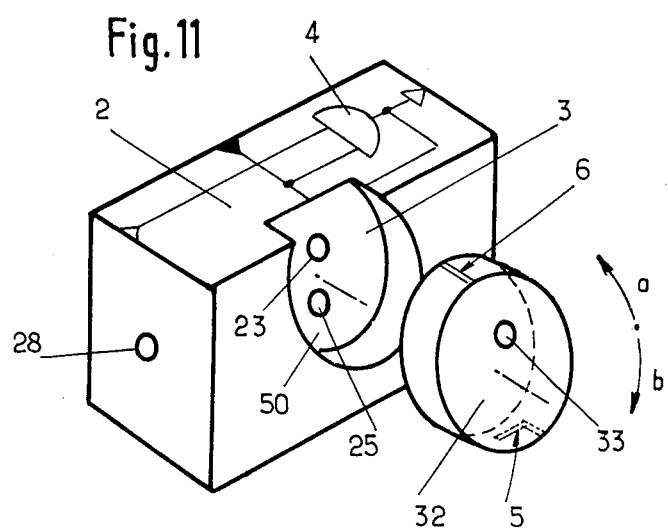

In FIG. 11, the selecting unit takes the form of a disc 32 comprising a channel 33 which appears opposite one of the two orifices 23 or 25.

Figure 12:
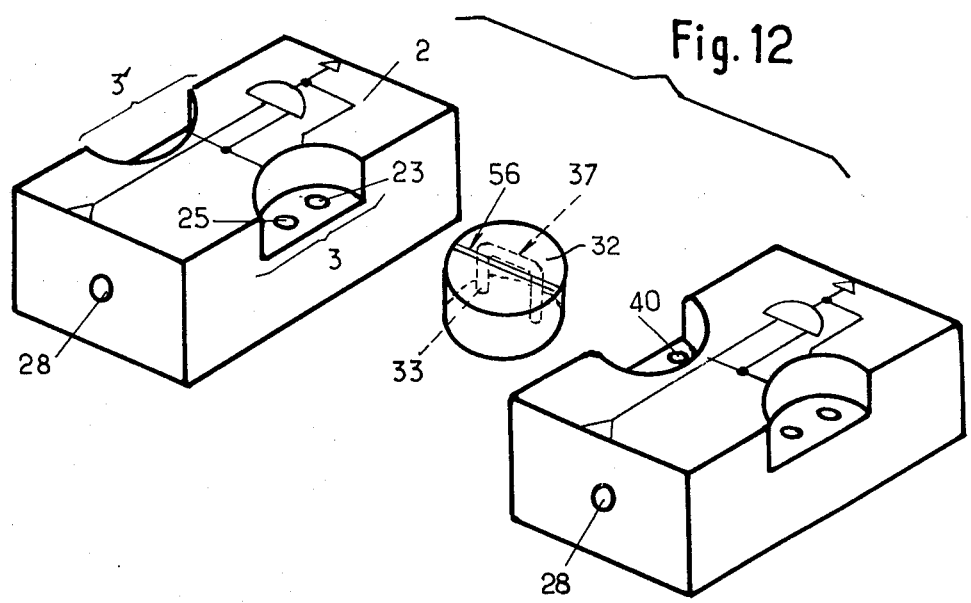

The example of FIG. 12 corresponds to one of the possibilities offered by the principle representation illustrated in FIG. 4; in this example the front surface comprises a first region 2 on which the graphic symbol is disposed, but it further comprises two second regions 3, 3' free of symbol, the selecting unit 32 is placed partially on one of the region 3 equipped with two orifices, and on the region 3' equipped with a single orifice 40, of the adjacent module.

However, this construction can also have the second region 3' with two orifices instead of one.

Figure 13:
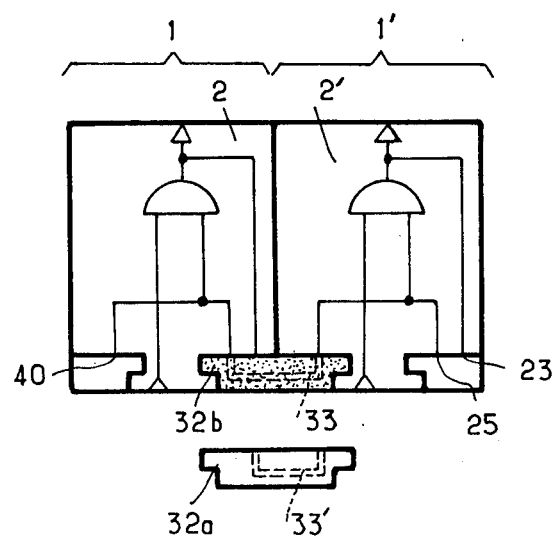

FIG. 13 illustrates another embodiment based on the same principle as above.

Figure 14:
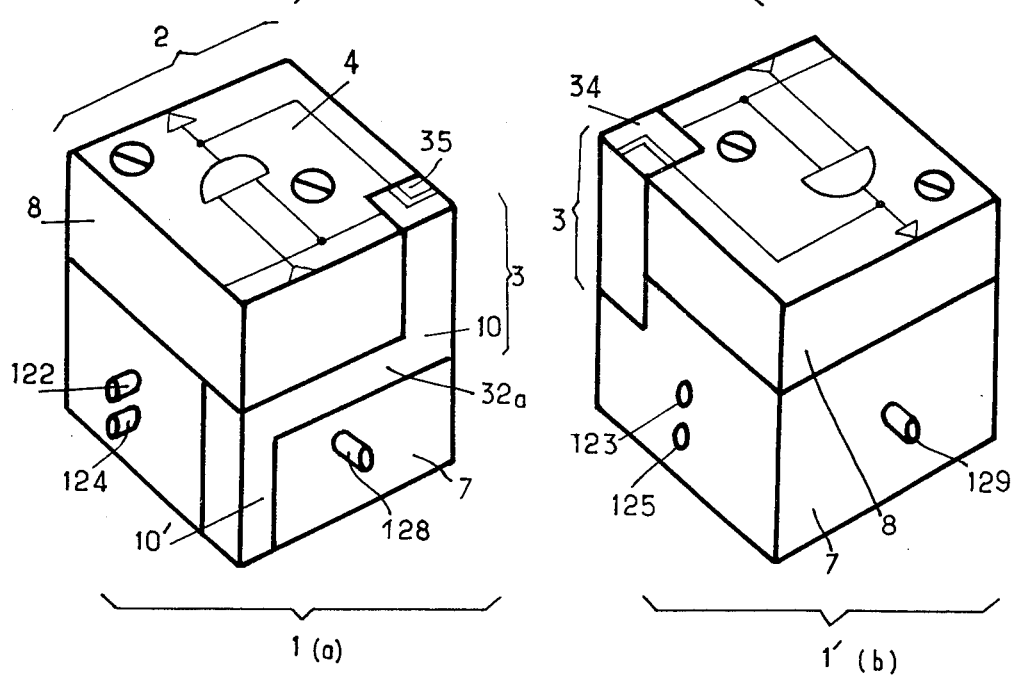
FIGS. 14 to 16 represent an example of construction of the principle described in FIGS. 6 and 7.
Figure 15:
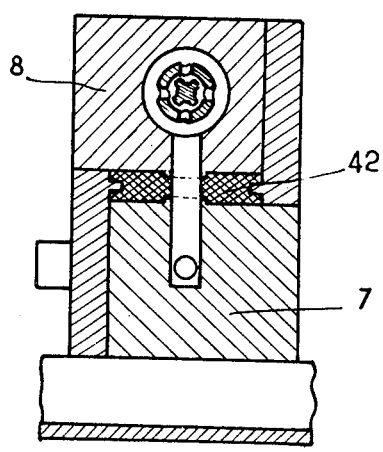
Figure 16:
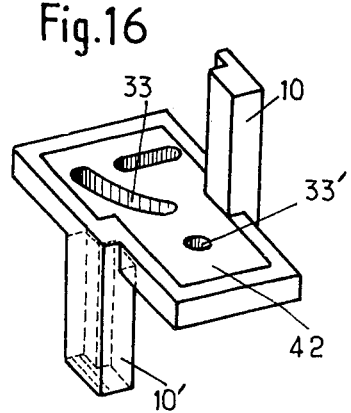

The module represented in FIG. 14 corresponds to FIGS. 6 and 7, whereas FIGS. 15 and 16 illustrate an example where the central part of the selecting unit 32 is constituted by a resilient seal 42.

Figure 17:
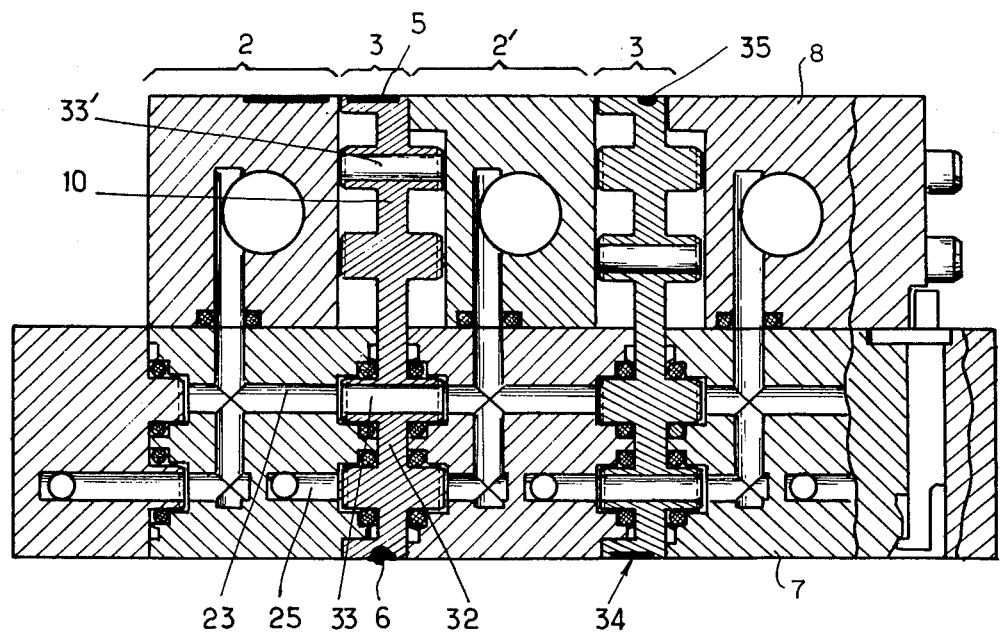
FIGS. 17 and 18 illustrate a variant when the logic module is composed of a baseplate and of a logic subassembly.

A selecting unit having a different form can also be employed when the module has a baseplate 7 and a removable logic subassembly 8. Such a selecting unit is illustrated at 32 in FIGS. 17 and 18; in this embodiment the selector is partially imbricated between two adjacent modules, but it still has two opposite faces 34, 35, bearing portions of graphic symbol 5, 6, which become level with front surface 2 in a region 3 and contains two channels 33, 33' one of them being placed on a prolongation 10 of the selecting unit 32.

Figure 18:
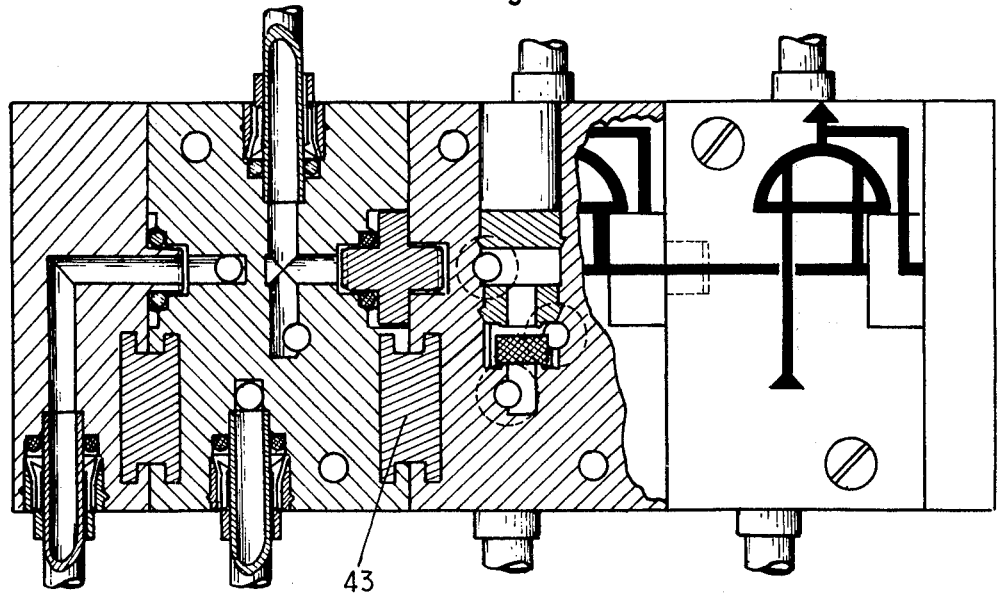

In FIG. 18 use is made of a coupling unit 43 to provide the juxtaposition of two adjacent modules.

It is possible to construct many families of embodiments of which only some examples have been given and which do not constitute a limitation of the invention. Thus, one can substitute rotary or invertible selecting units by sliding units in the manner of a drawer, based on the principle of FIG. 5.

It is obvious that such constructions fall within the scope of the invention because they include the necessary features in order that the modules be directly juxtaposable, that their front surface may be shaped for receiving a visible portion of the diagram born by a selecting unit which is able to take up at least two positions for which their graphic symbol cooperate with the symbols of the adjacent modules and that said selecting unit may be simply provided with at least one channel whose utilization depends only upon its position.

We claim:

1. An assembly of fluid logic circuit module means comprising, in combination:
   i. a first fluid logic circuit module means
   ii. a second fluid logic circuit module means, each said module means having a first face, a parallel second face, and a graphic symbol representing the module function, said module means being disposed with their first and second faces parallel, said module means defining between them a recess into which there open fluid passages in the module means,
   iii. a selecting unit disposed in said recess and cooperating with said module means, said selecting unit including:
      a. at least one connecting channel
      b. a graphic symbol on a face of the unit, said selecting unit and said recess being shaped and dimensioned such that said selecting unit may adopt each of two positions in said recess, in each of which positions the connecting channel connects fluid passages of the module means in a respective manner, and in each of which positions the graphic symbol of the unit is presented adjacent the graphic symbol of the module means to indicate the manner of connection of the passages.

2. An assembly, as claimed in claim 1, wherein
   i. the fluid passages of each module means are included in a fluid passage system thereof which has at least one input and one output
   ii. each module means has a further face with an output opening connected to said one output of the module means, and
   iii. two fluid passages respectively connected to the input and output of the system open at said recess.

3. An assembly, as claimed in claim 2, wherein each module means includes a fluid passage opening into said recess and which is selectively placed in communication with said input passage and said output passage of the system in a respective one of the two positions of the selecting unit.

4. An assembly, as claimed in claim 1, wherein said selecting unit is rotatable into each of said two positions, said selecting unit having two faces each of which is marked with a respective graphic symbol, a respective one of said faces being presented with its graphic symbol adjacent the graphic symbol of the module means.

5. An assembly, as claimed in claim 1, constituting a module and comprising:
   i. a base plate having input and output connections
   ii. a subassembly including logic circuitry secured on said baseplate, said subassembly having said graphic symbol,
   and wherein said selecting unit includes prolongations having an end face alignable with said graphic symbol and bearing a respective graphic symbol.

6. An assembly, as claimed in claim 5, wherein said selecting unit comprises a central portion between said prolongations, said central portion including connecting channels disposed at different radial spacings from an axis of rotation of the selecting unit with respect to the modules, thereby in each of two positions of rotation at 180° to provide communication between respective fluid passages of the modules.

* * * * *